Dec. 21, 1965  W. F. MELLEN  3,224,392
SOIL TILLAGE APPARATUS
Filed Sept. 8, 1964  3 Sheets-Sheet 3
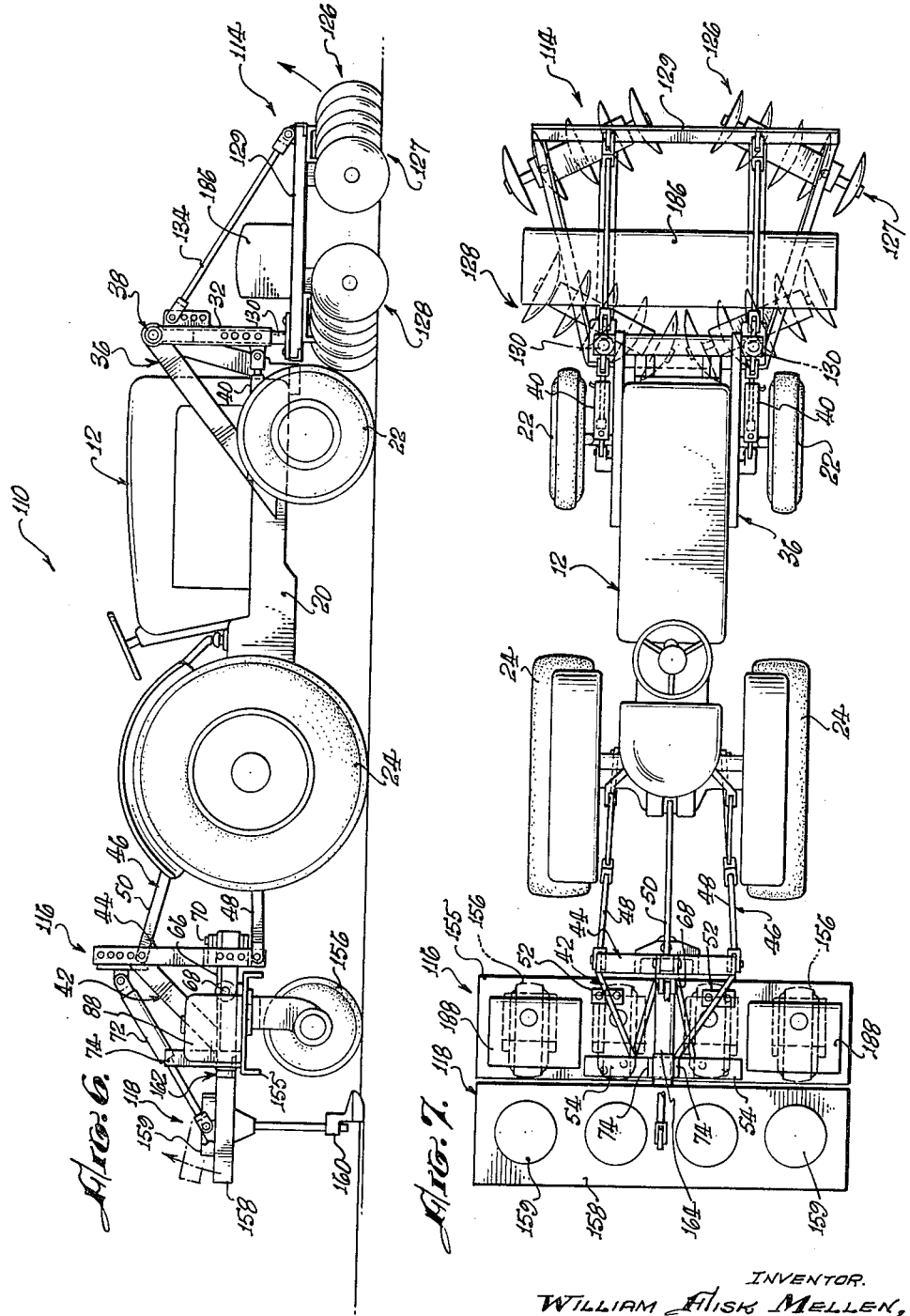
INVENTOR.
WILLIAM FISK MELLEN,
By His Attorneys
HARRIS, KIECH, RUSSELL & KERN.

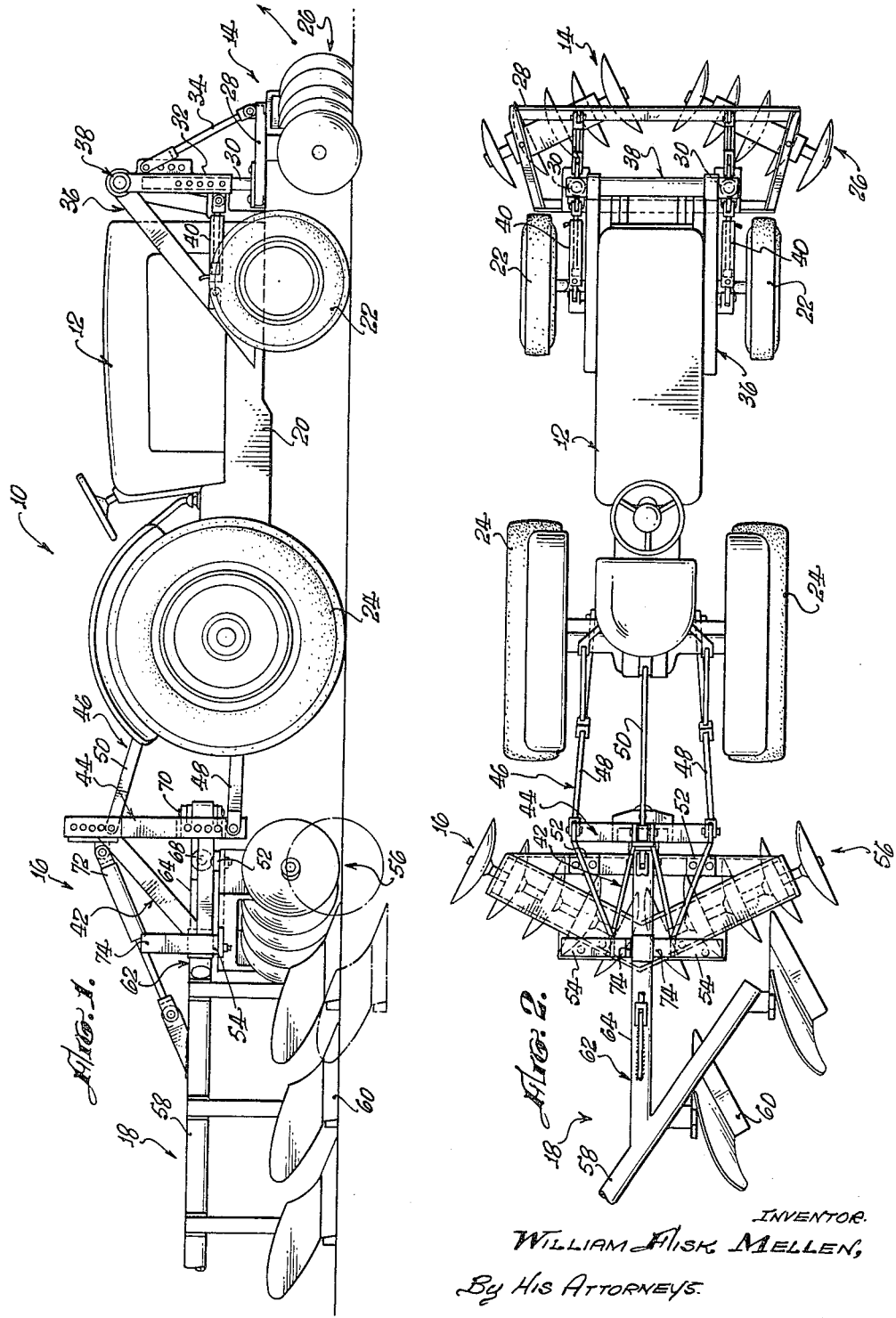

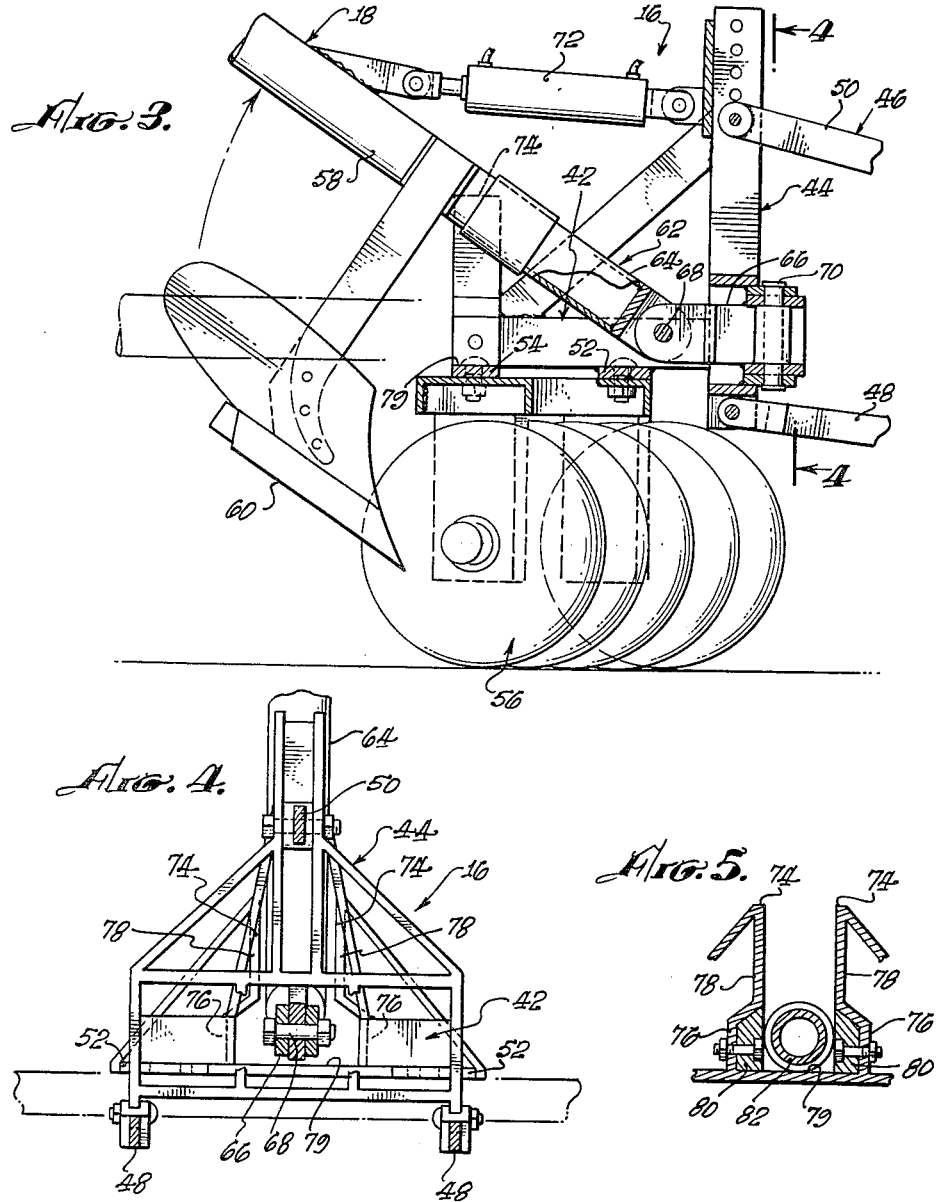

United States Patent Office 3,224,392
Patented Dec. 21, 1965

3,224,392
SOIL TILLAGE APPARATUS
William Fisk Mellen, Anaheim, Calif.
(P.O. Box 2032, Fullerton, Calif.)
Filed Sept. 8, 1964, Ser. No. 394,692
2 Claims. (Cl. 111—52)

The present application is a continuation-in-part of my co-pending applications Serial No. 267,404, filed March 25, 1963 and Serial No. 350,739, filed March 10, 1964.

The present invention relates in general to a tractor-powered soil tillage apparatus and, more particularly, to an apparatus which is especially well suited to the practice of minimum tillage, i.e., the practice of producing good seedbeds with a minimum of overall tillage.

More specifically, important objects of the invention are to provide a program of minimum tillage, and an apparatus for carrying out such program, wherein: the apparatus is capable of producing adequate over-all tillage, and adequate seedbeds, in a minimum number of trips across or around a field, the apparatus being capable of accomplishing this in one trip in some instances; the apparatus minimizes implement-produced and tractor-produced soil compaction by minimizing the number of trips required for a given number of tillage operations; the apparatus minimizes tractor wear and further minimizes tractor-produced soil compaction by avoiding running any of the wheels of the tractor in a furrow produced by a disc or moldboard plow drawn by the tractor; the apparatus minimizes tillage costs, and minimizes implement-produced and tractor-produced soil compaction, by performing a plurality of tillage operations simultaneously; and the apparatus is capable of performing a wide variety of tillage operations in various combinations, such as discing and plowing simultaneously, discing, preparing seedbeds and seeding simultaneously, and the like. As will be apparent from the foregoing, the term "tillage" is used broadly herein to cover any operation performed on the soil.

More particularly, a primary object of the invention is to provide a tractor-powered soil tillage apparatus which utilizes plural semimounted or fully mounted tillage tools on a single tractor, and in which the tools are so arranged that the apparatus is not overbalanced longitudinally when the tillage tools are lifted clear of the ground in various combinations. Consequently, the invention avoids any need for counterbalancing the tools, either by means of weights mounted on the tractor, filling the tractor tires with liquid, or the like.

Still more particularly, an important object of the invention is to divide the total tillage-tool load into front and rear tillage tools, or tillage-tool combinations, capable of movement between raised, inoperative and lowered, operative positions, and capable of performing different tillage operations.

Another object of the invention is to provide such a plural-tillage-tool apparatus wherein the front tillage tool, when in its lowered, operative position, tills the soil ahead of the tractor to a level below that of the ground surface on which the tractor runs.

A more specific object of the invention is to provide a tractor-powered soil tillage apparatus comprising: a tractor including a tractor frame having mounted thereon tractor driving and supporting means, such as wheels or tracks, engageable with the surface of the ground; a front tillage tool located ahead of the tractor and preferably having a width greater than that of the tractor driving and supporting means; front tool mounting means mounting the front tillage tool on the tractor frame ahead of the tractor driving and supporting means for movement between a raised, inoperative position clear of the ground and a lowered, operative position wherein it tills the soil below the surface of the ground; and front tool lifting means, forming part of the front tool mounting means and interconnecting the front tillage tool and the tractor frame, for moving the front tillage tool between its raised and lowered positions.

A fundamental object of the invention is to provide a rear tillage-tool combination which includes a rear carrier located directly behind the tractor and adapted to be moved between a raised, inoperative position clear of the ground and a lowered, operative position, and which includes a rear tillage tool behind the carrier and adapted to be moved between a raised, inoperative position and a lowered, operative position independently of the carrier.

A more specific object of the invention in the foregoing connection is to provide a rear tillage-tool combination which includes: a carrier located behind the tractor and including a carrier frame having mounted thereon carrier supporting means engageable with the ground surface; carrier mounting means mounting the carrier frame on the tractor frame behind the tractor driving and supporting means for movement of the carrier between a raised, inoperative position clear of the ground and a lowered, operative position wherein the carrier supporting means engages the ground surface; carrier lifting means, forming part of the carrier mounting means and interconnecting the carrier frame and the tractor frame, for moving the carrier between its raised and lowered positions; a rear tillage tool located behind the carrier; rear tool mounting means mounting the rear tillage tool on the carrier frame behind the carrier supporting means for movement between a raised, inoperative position clear of the ground and a lowered, operative position wherein it tills the soil; and rear tool lifting means, forming part of the rear tool mounting means and interconnecting the rear tillage tool and the carrier frame, for moving the rear tillage tool between its raised and lowered positions independently of the carrier.

Another object of the invention is to provide a soil tillage apparatus wherein the carrier itself constitutes a third, intermediate tillage tool located behind the tractor and ahead of the rear tillage tool, this being accomplished by utilizing soil tillage means, such as disc blades, coulter blades, soil compacting devices, or the like, as the carrier supporting means. Thus, it will be apparent that the carrier supporting means may be selected from a wide variety of more-or-less conventional tillage tools.

Another object of the invention is to provide a tractor-powered soil tillage apparatus of the foregoing nature wherein the front and rear tillage tools are also selected from a wide variety of more-or-less conventional tillage tools used individually, or in various combinations.

The foregoing carrier and rear-tillage-tool combination, wherein the rear tillage tool is liftable clear of the ground independently of the carrier, renders the tractor-powered soil tillage apparatus of the invention extremely flexible. In other words, the apparatus is rendered capable of handling a wide variety of soil and field conditions.

For example, let it be assumed that the front tillage tool and the carrier constitute disc or coulter harrow gangs and that the rear tillage tool comprises a disc or moldboard plow, it being an object of the invention to provide such a construction. With this construction, if soil and field conditions permit satisfactory tillage in a single operation, the plow may be a two-way plow set in its operative positions during trips across the field in both directions. On the other hand, if soil conditions, or trash quantities, are such that two trips with the disc or coulter harrow are desirable for each strip of ground, the plow can be a one-way plow set in its operative position during alternate trips only. Thus, this species of the invention is readily adaptable to various soil and field conditions.

As another example, let it be assumed that the front tillage tool comprises a disc harrow, the carrier supporting means comprises laterally spaced soil compacting devices, and the rear tillage tool comprises a seeder having seeding devices behind the soil compacting devices, it being another object of the invention to provide such a specific construction. With this particular construction, seeding can be carried out during all trips across the field if soil and field conditions are such that one harrowing operation is sufficient. If two are required, seeding may be carried out during alternate trips, the seeder being raised into its inoperative position during the intervening trips.

Similar results may be achieved with other tillage means embodied in the front tillage tool, the carrier and the rear tillage tool.

Another important object in connection with the hereinbefore-discussed seeder species of the invention is to provide the carrier with laterally-spaced soil compacting devices having the form of caster wheels. Such wheels on the carrier ahead of the respective seeding devices will automatically compact the soil to form seedbeds for planting. Also, they will caster when the tractor is turned around at the end of each trip across the field, thereby making it unnecessary to lift the carrier clear of the ground when turning around, it being necessary to lift only the front harrow and the rear seeder.

Another important object of the invention is to provide a rear tool mounting means, for mounting the rear tillage tool on the carrier frame, which includes draft means incorporating therein substantially vertical pivot means and transverse, substantially horizontal pivot means. Such pivot means respectively permit the rear tillage tool to swing laterally from side to side about a substantially vertical pivot axis, and, under some conditions, to float upwardly and downwardly about a transverse substantially horizontal pivot axis. The lateral swinging permitted by the substantially vertical pivot means is particularly important in the case of a moldboard plow since it eliminates side draft on the carrier and the tractor. The vertical floating movement which can be acheived with the transverse, substantially horizontal pivot means is important under some conditions because it prevents the rear tillage tool from imposing vertical loads on the carrier and the tractor in response to surface irregularities. At other times, however, it is desirable to have the rear tillage tool impose a downward load on the carrier to hold tillage means mounted thereon in the ground.

An important advantage of the invention results from utilizing a disc harrow, or at least one disc harrow gang, as the front tillage tool ahead of the tractor. This construction is important because of the leveling effect produced by the front disc harrow, or disc harrow gang, which leveling effect permits the apparatus to be operated crosswise of furrows without the jolting of the tractor and its driver normally resulting from cross-furrow tillage.

Another object of the invention is to provide a tractor-mounted soil tillage apparatus wherein the rear tillage tool comprises a disc or moldboard plow so located laterally relative to the tractor that the tractor runs on level ground ahead of the plow. In other words, the right-hand wheels of a wheel-type tractor are not run in a previously-plowed furrow. This avoids the soil compaction which results from running the right-hand wheels in a previously-plowed furrow, avoids the tire-sidewall wear which results therefrom, avoids the driver fatigue caused by the lateral tractor inclination which results from running the right-hand wheels in a previously-plowed furrow, and the like, all of these being important features.

Another object is to utilize as one or more of the three tillage tools of the invention disc harrow gangs of such constructions and/or locations or orientations as to avoid side loads on the tractor.

Still another object of the invention is to provide a tractor-mounted soil tillage apparatus wherein the carrier is pivotable upwardly and forwardly, relative to the tractor, into its raised position, and wherein the rear tillage tool is also pivotable upwardly and forwardly, relative to the carrier, into its raised position. Consequently, when both the carrier and the rear tillage tool are in their raised positions, their centers of gravity are shifted forwardly somewhat to reduce the effect of their rearwardly overhanging weights, which are offset by the forwardly overhanging weight of the front tillage tool when it is in its raised position.

Yet another object is to provide a front tillage tool which is pivotable downwardly and rearwardly from its raised position into its operative position about an axis above and rearwardly of the tool. With this construction, the drag exerted on the front tillage tool forces it into the ground. This is a particularly important feature when the front tillage tool is a disc harrow, or a disc harrow gang, since the disc blades need not be set at a large angle to hold them in the ground. The smaller disc-blade angle permitted by this aspect of the invention thus reduces the power required to operate the front disc harrow or disc harrow gang.

In the event that the carrier embodies a disc harrow gang and the rear tillage tool is a plow, the angle of these disc blades may also be reduced because the plow acts to help hold them in the ground. Thus, the power required to operate the disc gang embodied in the carrier is reduced.

By utilizing the principles discussed in the two preceding paragraphs to minimize the disc-blade angles for disc harrow gangs ahead of and behind the tractor, a substantial reduction in the power required to operate the two gangs may be achieved. Also, since the two disc harrow gangs loosen the soil ahead of the plow comprising the rear tillage tool, the power required to operate the plow is minimized. In fact, the total power required with this arrangement is little more than that required to operate the disc harrow gangs alone. In other words, the plow adds little to the power requirements of the combination.

As will be apparent from the foregoing, the present invention minimizes soil tillage costs, and minimizes soil compaction, by performing plural tillage operations simultaneously while providing flexibility to accommodate varying soil and field conditions. At the same time, the invention permits a conventional tractor of a particular size to utilize more semimounted or fully mounted tillage tools because the tool load on the tractor is so divided as to avoid overbalancing when the tools are raised into their inoperative positions.

The foregoing objects, advantages, features and results of the present invention, together with various other objects, advantages, features and results thereof which will be evident to those skilled in the soil tillage art in the light of this disclosure, may be achieved with the exemplary embodiments of the invention described in detail hereinafter and illustrated in the accompanying drawings, in which:

FIG. 1 s a side elevational view of one embodiment of the tractor-mounted soil tillage apparatus of the invention;

FIG. 2 is a plan view of the apparatus illustrated in FIG. 1;

FIG. 3 is an enlarged, fragmentary view, partially in elevation and partially in section, duplicating a portion of FIG. 1;

FIG. 4 is a sectional view taken as indicated by the irregular arrowed line 4—4 of FIG. 3;

FIG. 5 is a fragmentary sectional view similar to a portion of FIG. 4, but illustrating a modification;

FIG. 6 is a side elevational view of another embodiment of the tractor-mounted soil tillage apparatus of the invention; and FIG. 7 is a plan view of the apparatus which is shown in FIG. 6 of the drawings.

*Soil tillage apparatus 10*

Referring initially to FIGS. 1 and 2, illustrated therein is a soil tillage apparatus 10 which includes: a tractor 12; a front tillage tool 14 located ahead of the tractor and movable between a lowered, operative position, wherein it tills the soil ahead of the tractor, and a raised inoperative position, wherein it is clear of the ground; a carrier 16 located behind the tractor and movable relative to the tractor between a lowered, operative position wherein it engages the ground and a raised, inoperative position wherein it is clear of the ground; and a rear tillage tool 18 located behind the carrier and movable relative to the carrier between a lowered, operative position, wherein it tills the soil behind the carrier, and a raised, inoperative position, wherein it is clear of the ground. In the particular embodiment 10 under consideration, the carrier 16 constitutes an intermediate tillage tool which tills the soil behind the tractor when it is in its lowered, operative position. The tractor 12 is shown as being of the wheel type and as including a frame 20 supported by steerable front wheels 22 and driving rear wheels 24. However, it will be understood that the invention is not limited to this particular type of tractor.

Considering the front tillage tool 14 in more detail, it is shown as comprising a forwardly oriented tandem disc harrow gang 26 having a frame 28 which includes standards 30 extending upwardly into tubular frame members 32. The standards 30 and the tubular frame members 32 may be pinned together with the disc harrow gang 26 set at various depths. The frame 28 is braced relative to the tubular frame members 32 by diagonal braces 34 pivotally connected at their ends to the frame 28 and the frame 32. The braces 34 are adjustably connected to the frame members 32 to permit setting the disc harrow gang 26 for different depths.

The tractor frame 20 includes at the front end thereof a framework 36 to which the frame members 32 are pivotally connected by a transverse, horizontal pivot means 38 located above and rearwardly of the disc harrow gang 26. With this construction, the disc harrow gang 26 is pivotable, about the transverse, horizontal pivotal axis provided by the pivot means 38, between the lowered, operative position shown in FIG. 1 and a raised, inoperative position, not shown, wherein the disc harrow gang 26 is displaced upwardly and forwardly from its lowered, operative position. Reciprocating-type hydraulic motors 40 serve as means for moving the disc harrow gang 26 between its lowered, operative position and its raised, inoperative position. Each of these hydraulic motors is pivotally connected at one end to one of the frame members 32 and at its other end to the framework 36. Hydraulic fluid may be supplied to the motors 40 from the hydraulic system, not shown, with which the tractor 12 is conventionally provided.

It is important to note that with the mounting means shown, the disc harrow gang 26 pivots downwardly and rearwardly into its lowered, operative position about the transverse, horizontal pivot axis located above and rearwardly of this gang. Consequently, the drag exerted on the disc harrow gang 26 forces the disc blades thereof into the ground, the weight of the front end of the tractor 12 being utilized to hold the disc blades in the ground. Consequently, as hereinbefore outlined, the blades of the disc harrow gang 26 may be set at relatively small angles to minimize the power required to operate the disc harrow gang 26, which is an important feature.

Turning now to the carrier 16, it includes a carrier frame 42 having at the front thereof a conventional A-frame 44. The carrier frame 42 is mounted on the tractor frame 20 by a conventional three-point linkage 46 comprising two draft links 48 and a lifting link 50 connected at their forward ends to the tractor frame and at their rear ends to the A-frame 44. The manner in which the three point linkage 46 raises and lowers the A-frame 44 is well known in the art so that a further description is not necessary, it being apparent that the entire carrier frame 42 is raised and lowered along with the A-frame. It will be understood, however, that the invention is not limited to the specific three-point linkage 46 and A-frame 44 shown since the carrier 16 may be mounted on the tractor frame, and raised and lowered relative thereto, by other mounting and lifting means.

The carrier frame 42 is provided on its lower side, and rearwardly of the A-frame 44, with front and rear mounting pads 52 and 54 to which various tillage tools may be bolted, or otherwise secured. In the particular embodiment 10 under consideration, a rearwardly oriented tandem disc harrow gang 56 is bolted to the mounting pads 52 and 54. The disc harrow gang 56 complements the disc harrow gang 26 and, together, the two gangs form a complete tandem disc harrow which imposes no side loads on the tractor 12. If desired, the blades of the disc harrow gang 56 on the carrier frame 42 may be of larger diameter than the blades of the front disc harrow gang 26 to permit deeper tillage by the rear disc harrow gang. (In this connection, it might be pointed out that the draft links 48 and the lifting link 50 are pivotally connectible to the A-frame 44 at various vertically spaced points for depth adjustment.)

The rear tillage tool 18, which is a one-way moldboard plow in the particular embodiment 10 under consideration, helps hold the rear disc harrow gang 56 in the ground, irrespective of whether the rear tillage tool 18 is in the ground, or is in its raised position, which will be discussed hereinafter. Consequently, the angle of the blades of the disc harrow gang 56 may be relatively small to reduce the power required to operate this gang. Thus, the invention permits the use of relatively small disc-blade angles for both the front and rear disc harrow gangs 26 and 56, and correspondingly reduces their power requirements. Furthermore, the front and rear disc harrow gangs 26 and 56 thoroughly loosen the soil in advance of the moldboard plow constituting the rear tillage tool 18, thereby reducing the power required to operate the plow. The over-all result is that the two disc harrow gangs 26 and 56 and the plow 18 may be operated with little more power than would be required to operate the plow alone without the two disc harrow gangs. Thus, the present invention achieves the advantages of discing ahead of the plow 18 with a relatively small increase in power requirements, the advantages of discing before plowing being well known, and including such things as reducing clod sizes, cutting up trash to insure better coverage by the plow, and the like.

Considering the plow 18 in more detail, it is shown as being a one-way plow of the moldboard type having a frame 58 carrying bottoms 60 of a number and width sufficient to plow a strip of the same width as that disced by the two disc harrow gangs 26 and 56. Preferably, the strip tilled by the disc harrow gangs 26 and 56 and the plow bottoms 60 exceeds the wheel tread of the tractor 12. Also, it will be noted that the plow is so positioned laterally of the tractor 12 that the right-hand wheels of the tractor are not required to run in a previously-plowed furrow. This avoids the soil compaction which results from running the right-hand wheels in a previously-plowed furrow, avoids the tire-sidewall wear which results therefrom, avoids the driver fatigue caused by the lateral tractor inclination which results from running the right-hand wheels in a previously-plowed furrow, and the like.

The plow frame 58 is connected to the carrier frame 42 by a draft means 62 comprising a tongue 64. The forward end of the tongue 64 is pivotally connected to the rearward end of a draft member 66 by a transverse horizontal pivot pin 68, and the forward end of the draft member 66 is pivotally connected to the carrier frame 42 by a vertical pivot pin 70. With this construction, the plow 18 is free to trail laterally about the axis of the vertical pivot pin 70, i.e., is free to swing from side to side about the axis of the vertical pin 70, to avoid side draft on the tractor 12.

The transverse, horizontal pivot pin 68 serves to permit pivoting the plow 18 upwardly and forwardly into its raised, inoperative position wherein it is clear of the ground, as shown in FIG. 3 of the drawings. For the purpose of lifting the plow 18 into its inoperative position, a reciprocating-type hydraulic motor 72 is pivotally connected to the A-frame 44 and to the plow frame 58. As will be apparent, contraction of the hydraulic motor 72 lifts the plow 18 into its inoperative position, whereas extension of the hydraulic motor lowers the plow into its operative position. The hydraulic motor 72 may be operated from the hydraulic system, not shown, of the tractor 12.

Referring to FIG. 4 of the drawings, the tongue 64 of the plow 18 extends rearwardly from the transverse, horizontal pivot pin 68 between a pair of upright restraining members 74 on the carrier frame 42. When the plow 18 is in its lowered, operative position, the tongue 64 is disposed between relative-widely-spaced portions 76 of the restraining members 74 to permit the tongue to swing laterally from side to side. This permits the hereinbefore-discussed lateral trailing action of the plow 18. However, when the plow 18 is lifted into its inoperative position, the tongue 64 is displaced upwardly between relatively-narrowly-spaced portions 78 of the restraining members 74. Under such conditions, lateral swinging movement of the plow 18 is minimized to avoid having the plow bang back and forth when it is out of the ground. Thus, the restraining members 74 provide an automatic swing lock when the plow 18 is out of the ground, but permit the plow to trail laterally when it is in the ground, within the limits established by the portions 76 of the restraining members.

It will be noted that the tongue 64 of the plow 18 is engageable with a portion of the carrier frame 42 which acts as a stop 79 to limit downward movement of the plow relative to the carrier. Preferably, the hydraulic motor 72 holds the plow tongue 68 against the stop 79 when the disc harrow gang 56 is in use. Under these conditions, the weight and suck of the plow 18 are applied to the disc harrow gang 56 to help hold the blades thereof in the ground. Sometimes, however, it is desirable to permit the plow 18 to float or trail vertically about the transverse, horizontal pivot axis provided by the pivot pin 68, thereby avoiding the imposition of vertical loads on the tractor. For example, if the ground is extremely soft or wet, or if the disc harrow gang 56 is removed from the carrier frame 42, vertical floating of the plow 18 may be desirable. This may be achieved by providing a bypass valve, not shown, which bypasses the piston of the hydraulic motor 72 so that the latter does not restrain vertical floating movement of the plow.

In some instances, as in the apparatus illustrated in FIGS. 6 and 7 of the drawings and described hereinafter, it may be desirable to prevent or minimize lateral swinging of a rear tillage tool in an operative position thereof. Under such conditions, and referring of FIG. 5 of the drawings, suitable stops 80 may be secured to the widely-spaced portions 76 of the restraining members 74 to present or minimize lateral swinging movement of a tongue 82.

Considering some general aspects of the present invention as embodied in the soil tillage apparatus 10, dividing the implement load on the tractor 12 between the front and rear thereof permits the use of multiple fully-mounted tillage tools without overbalancing the tractor longitudinally and without requiring any counterbalancing means, such as weights on the tractor frame, liquid-filled tires, or the like. Expressed differently, the provision of the front tillage tool 14 permits the use of more and/or larger tillage tools 16 and 18 at the rear of the tractor. Thus, more tillage operations can be carried out at once, with the attendant advantages of reduced operating costs, reduced soil compaction, and the like.

Another feature of the invention in the foregoing connection is that since the carrier 16 moves upwardly and forwardly, relative to the tractor 12, into its inoperative position, and since the rear tillage tool 18 also moves upwardly and forwardly, relative to the carrier, into its inoperative position, the center of gravity of the combination of the carrier 16 and the rear tillage tool 18 is shifted forwardly somewhat. This reduces the effect of the overhanging weight at the rear of the tractor 12 and permits it to be offset by a smaller weight for the front tillage tool 14.

Various tillage techniques are possible with the apparatus 10 of the invention. For example, the two disc harrow gangs 26 and 56 may be used with the plow 18 lifted into its inoperative position. Alternatively, the two disc harrow gangs 26 and 56 and the plow 18 may be in their tilling positions simultaneously. It is also possible to utilize the front disc harrow gang 26 with the rear disc harrow gang 56 and the plow 18 in their inoperative positions. Alternatively, the front disc harrow gang may be lifted into its inoperative position with the rear disc harrow gang 56 in its operative position, the plow 18 being either in its operative position or its inoperative position. Normally, however, both the front and rear disc harrow gangs 26 and 56 will be in their operative positions simultaneously.

One tillage technique for which the apparatus 10 is particularly well suited involves traversing a field with the disc harrow gangs 26 and 56 operative and the plow 18 inoperative, and then traversing the field in the opposite direction, following the same strip, with all three tillage tools operative. This process is then repeated following successive strips across the field, discing in both directions and plowing in one direction only. This technique is particularly useful where soil and/or trash conditions make two discing operations desirable prior to plowing, and requires only the one-way plow 18 shown. If conditions are such that plowing in both directions across the field is desirable, utilizing only one discing operation prior to plowing, a two-way plow, not shown, may be substituted for the one-way plow 18. Also, the one-way plow 18 shown may be utilized in conjunction with a single discing operation by going around the field, rather than across it.

Another advantage of the apparatus 10 which arises from the provision of the front tillage tool 14 is that cross-furrow tillage is possible without jolting of the tractor 12 and its operator, the front tillage tool 14 serving to level a path for the wheels 22 and 24 of the tractor.

In coming out of the ground, as at the end of a trip across a field, the front tillage tool 14 is preferably lifted into its inoperative position first, followed by the rear tillage tool 18, and then the combination of the carrier 16 and the rear tillage tool. By following this procedure, the weight of the front tillage tool 14 is made available as a front overhanging weight to offset the rear overhanging weight of the combination of the carrier 16 and the rear tillage tool 18.

It will be noted from FIGS. 1 and 2 of the drawings that the carrier 16 and the rear tillage tool 18 are very closely coupled, the front plow bottom 60 actually longitudinally overlapping the disc harrow gang 56. This close coupling further minimizes the rear overhanging weight when the carrier 16 and the rear tillage tool 18 are out of the ground.

As suggested previously herein, the present invention is susceptible to incorporation in tillage apparatuses utilizing a wide variety of more-or-less conventional tillage tools in various combinations. An exemplary one of these is represented by the soil tillage apparatus 10 just described. Another is represented by a soil tillage apparatus which is illustrated in FIGS. 6 and 7 of the drawings and which is designated generally therein by the numeral 110. The soil tillage apparatus 110 will now be described.

*Soil tillage apparatus 110*

Turning to FIGS. 6 and 7 of the drawings, many of the components of the soil tillage apparatus 110 are identical to corresponding components of the apparatus 10. Such identical components will be identified by identical reference numerals.

Considered generally, the soil tillage apparatus 110 includes: the tractor 12; a front tillage tool 114 located ahead of the tractor and movable between a lowered, operative position, wherein it tills the soil ahead of the tractor, and a raised, inoperative position, wherein it is clear of the ground; a carrier 116 located behind the tractor and movable relative to the tractor between a lowered, operative position wherein it engages the ground and a raised, inoperative position wherein it is clear of the ground; and a rear tillage tool 118 located behind the carrier and movable relative to the carrier between a lowered, operative position, wherein it tills the soil behind the carrier, and a raised, inoperative position, wherein it is clear of the ground.

The front tillage tool 114 in the embodiment 110 under consideration comprises a tandem disc harrow 126 having front and rear disc gangs 127 and 128 mounted on a frame 129. The latter includes standards 130 extending upwardly into and adjustably connectible to the tubular frame members 32 previously described in connection with the apparatus 10. The disc harrow 126 is braced by diagonal braces 134 similar to the braces 34. In all other respects, the mounting and lifting means for the disc harrow 126 are the same as the mounting and lifting means for the disc harrow gang 26 of the soil tillage apparatus 10. Consequently, a further description is not necessary, except to point out that the disc harrow 126 is pivoted downwardly and rearwardly into its operative position in the same manner as the disc harrow gang 26. Consequently, the drag exerted on the disc harrow 126 forces its blades into the ground in the manner and with the advantages previously discussed.

The carrier 116 includes the same carrier frame 42, and the same mounting and lifting means therefor, as described previously in connection with the soil tillage apparatus 10. The carrier 116 differs from the carrier 16 in that instead of having the disc harrow gang 56 bolted to the mounting pads 52 and 54, it has a caster wheel frame 155 bolted thereto. The frame 155 carries transversely spaced caster wheels 156 having relatively wide treads for seedbed firming or compacting purposes.

The rear tillage tool 118 comprises a row seeder having a frame 158 carrying seed hoppers 159 and diagrammatically-shown seeding devices 160 operating in the respective seedbeds compacted by the caster wheels 156. The seeder 118 includes draft means 162 comprising a tongue 164 pivotally connected to the draft member 66 by the transverse, horizontal pivot pin 68 described previously. The seeder 118 is adapted to be moved between its operative and inoperative positions by the hydraulic motor 72. Preferably, to insure planting straight rows, lateral trailing of the seeder 118 is prevented or limited by means of stops, not shown, similar to the stops 80 illustrated in FIG. 5 of the drawings.

As will be apparent, the soil tillage apparatus 110 of the invention may be utilized to till the soil, prepare row crop seedbeds, and row seed in one operation, the apparatus 110 being suitable wherever a single discing operation provides sufficient tillage, or completes previous tillage. Thus, the apparatus 110 materially reduces costs, soil compaction, and the like, all of which are important features.

If desired, additional operations such as fertilizing, treating the soil with insecticides or fungicides, and the like, may be carried out simultaneously. For this purpose, tanks 186 and 188 are mounted on the frames 129 and 155. These tanks may contain materials of the nature indicated and may be provided with suitable means, not shown, for introducing such materials into the soil.

Considering the overall operation of the apparatus 110, after completing a trip across the field, the disc harrow 126 and the seeder 118 are lifted out of the ground preparatory to turning around. Normally, the carrier 116 will not be lifted clear of the ground, this being unnecessary since the caster wheels 156 will permit turning around while in engagement with the ground. After the tractor has been turned around and properly lined up, the disc harrow 126 and the seeder 118 are again lowered into the ground for another trip across the field.

The apparatuses 10 and 110 have been shown as providing for complete interchangeability of the front, intermediate and rear tillage tools, which is desirable in many instances. However, such complete interchangeability is not essential to many aspects of the invention.

Although exemplary embodiments of the invention have been disclosed herein for purposes of illustration, it will be understood that various changes, modifications and substitutions may be incorporated in such embodiments without departing from the spirit of the invention as defined by the claims which follow.

I claim:

1. In a soil tillage apparatus, the combination of
    (a) a tractor including a tractor frame having mounted thereon tractor driving and supporting means engageable with a ground surface;
    (b) a front tillage tool located ahead of said tractor;
    (c) front tool mounting means mounting said front tillage tool on said tractor frame ahead of said tractor driving and supporting means for movement, relative to said tractor frame, between a raised, inoperative position clear of the ground and a lowered, operative position wherein it tills the soil below said ground surface;
    (d) said front tool mounting means including front tool lifting means interconnecting said front tillage tool and said tractor frame for moving said front tillage tool between its said raised and lowered positions;
    (e) a carrier located behind and connected to said tractor and including a carrier frame having mounted thereon carrier supporting means engageable with said ground surface;
    (f) a rear tillage tool located behind said carrier;
    (g) rear tool mounting means mounting said rear tillage tool on said carrier frame behind said carrier supporting means for movement, relative to said carrier frame, between a raised, inoperative position clear of the ground and a lowered, operative position wherein it tills the soil;
    (h) said rear tool mounting means including rear tool lifting means interconnecting said rear tillage tool and said carrier frame for moving said rear tillage tool between its said raised and lowered positions;
    (i) said rear tillage tool comprising a seeder having laterally spaced seeding devices; and
    (j) said carrier supporting means including laterally spaced wheels respectively located in the paths of said seeding devices and adapted to firm the soil ahead of said seeding devices.

2. In a soil tillage apparatus, the combination of:
    (a) a tractor including a tractor frame having mounted thereon tractor driving and supporting means engageable with a ground surface;

(b) a front tillage tool located ahead of said tractor;
(c) front tool mounting means mounting said front tillage tool on said tractor frame ahead of said tractor driving and supporting means for movement, relative to said tractor frame, between a raised, inoperative position clear of the ground and a lowered, operative position wherein it tills the soil below said ground surface;
(d) said front tool mounting means including front tool lifting means interconnecting said front tillage tool and said tractor frame for moving said front tillage tool between its said raised and lowered positions;
(e) a carrier located behind said tractor and including a carrier frame having mounted thereon carrier supporting means engageable with said ground surface;
(f) carrier mounting means mounting said carrier frame on said tractor frame behind said tractor driving and supporting means;
(g) a rear tillage tool located behind said carrier;
(h) rear tool mounting means mounting said rear tillage tool on said carrier frame behind said carrier supporting means for movement, relative to said carrier frame, between a raised, inoperative position clear of the ground and a lowered, operative position wherein it tills the soil;
(i) said rear tool mounting means including rear tool lifting means interconnecting said rear tillage tool and said carrier frame for moving said rear tillage tool between its said raised and lowered positions;
(j) said rear tillage tool comprising a seeder having laterally spaced seeding devices; and
(k) said carrier supporting means including laterally spaced caster wheels respectively located in the paths of said seeding devices and adapted to firm the soil ahead of said seeding devices.

References Cited by the Examiner

UNITED STATES PATENTS

| | | | |
|---|---|---|---|
| Re. 22,627 | 4/1945 | McKay | 172—450 X |
| 1,251,945 | 1/1918 | Wagner | 111 |
| 1,431,815 | 10/1922 | Kanke | 172—178 |
| 1,547,271 | 7/1925 | Toney | 172—276 |
| 2,180,618 | 11/1939 | Strandlund | 172—693 X |
| 2,444,321 | 6/1948 | Wooldridge | 172—277 |
| 2,608,924 | 9/1952 | Bywater et al. | 172—276 |
| 2,640,307 | 6/1953 | Robertson | 172—595 X |
| 2,673,434 | 3/1954 | Babinchak | 172—178 |
| 2,864,181 | 12/1958 | Simmons | 172—449 X |
| 3,037,470 | 6/1962 | Watson et al. | 111—1 X |
| 3,140,745 | 7/1964 | Hinkle et al. | 172—292 |

ABRAHAM G. STONE, *Primary Examiner.*

WILLIAM A. SMITH, III, *Examiner.*